United States Patent [19]

Nishi et al.

[11] Patent Number: 5,525,670
[45] Date of Patent: Jun. 11, 1996

[54] AQUEOUS COATING COMPOSITION AND COATING PROCESS USING THE SAME

[75] Inventors: Tadahiko Nishi, Yamatokoriyama; Hideaki Ogawa, Hirakata; Hisaki Tanabe, Yawata; Kunihiko Takeuchi, Mino, all of Japan

[73] Assignee: Nippon Paint Co., Ltd., Osaka, Japan

[21] Appl. No.: 287,902

[22] Filed: Aug. 9, 1994

[30] Foreign Application Priority Data

Aug. 10, 1993 [JP] Japan ................................. 5-198329
Apr. 28, 1994 [JP] Japan ................................. 6-091796

[51] Int. Cl.⁶ ................ C09D 167/02; C09D 167/08; C09D 169/00; C09D 133/00
[52] U.S. Cl. ............... 524/512; 524/513; 524/522; 524/537; 525/124; 525/125; 525/131; 525/155; 525/159; 525/162; 525/185; 525/439
[58] Field of Search .................... 524/512, 513, 524/522, 537; 525/124, 125, 131, 155, 159, 162, 185, 439

[56] References Cited

U.S. PATENT DOCUMENTS 5,030,683  7/1991  Nakamura .................... 524/512

FOREIGN PATENT DOCUMENTS 0458243  11/1991  European Pat. Off. .
0554865   8/1993  European Pat. Off. .
 562577   9/1993  European Pat. Off. .
 009434   1/1993  Japan .
WO92/1132  7/1992  WIPO .

*Primary Examiner*—David Buttner
*Attorney, Agent, or Firm*—Wenderoth, Lind & Ponack

[57] ABSTRACT

The present invention provides the improvement of coating workability (e.g. pinhole resistance, sagging resistance, etc.) of an aqueous coating composition. That is, the present invention provides an aqueous coating composition which comprises: (A) an acrylic resin and/or a polyester resin having an acid value of 10 to 100, a hydroxyl value of 20 to 300 and a number average-molecular weight of 1,000 to 50,000; (B) a polycarbonate resin having a number average-molecular weight of 1,000 to 10,000 which contains a hydroxyl group at the terminal end; and (C) a curing agent.

15 Claims, No Drawings

AQUEOUS COATING COMPOSITION AND COATING PROCESS USING THE SAME

FIELD OF THE INVENTION

The present invention relates to an aqueous coating composition providing a coat having good appearance, which is superior in coating workability (e.g. pinhole resistance, sagging resistance, etc.) and surface smoothness.

BACKGROUND OF THE INVENTION

Aqueous coating compositions are used for intercoating and base topcoating of automobiles. Heretofore, organic solvent type coatings have been exclusively used for automobiles. However, it is now strongly demanded to change from organic solvent type coatings to aqueous coatings in view of safety on coating process, reduction of environmental pollution, resources-saving and the like.

As the aqueous intercoating composition, for example, there have been known an aqueous intercoating composition comprising a carboxylic group-containing resin, an urethane bond-containing diol and resin particles (Japanese Patent Laid-Open Publication No. 3-52973), a thermosetting aqueous coating composition comprising a polyhydric carboxylic acid resin, an amino resin, a linear low molecular weight polyester diol and an benzoin (Japanese Laid-Open Patent Publication No. 4-93374) and the like. However, various problems are arisen when using them for intercoating.

That is, surface smoothness and final appearance are not sufficient. Further, "pinhole" as a defective appearance caused by bumping of water during curing a coated film is liable to be arisen in comparison with a conventional organic solvent type paint. This phenomenon is observed in case that the film thickness is 20 to 40 µm and it becomes the cause of deterioration of the final appearance. Further, water resistance of the coating containing the linear low molecular weight polyester diol is not sufficient.

In general, a two coat/one bake coating process which comprises coating a metallic base paint containing a metallic pigment on a plate on which primer-coated and intercoated (referred to as topcoating), followed by wet-on-wet coating a clear paint without curing the metallic base coat, and then simultaneously curing the metallic base coating and clear coating, is used for coating automobiles. In the metallic base paint used for this process, a flake metal pigment (e.g. aluminum) is satisfactorily oriented so that an excellent appearance of the coated film can be obtained.

Particularly, an aqueous metallic base coating composition comprising a water dispersant of an amide group-containing acidic resin and hydrophilic group-carrying polyurethane resin as a main component (Japanese Laid-Open Patent Publication No. 4-25582) is known as to the above application. However, "pinhole" as a defective appearance is liable to be arisen when the coated film is cured with heating after a clear coating was coated and, therefore, this paint is not necessarily satisfactory.

SUMMARY OF THE INVENTION

The present inventors have intensively studied in order to solve the above problems of the prior art. As a result, it has been found that the above problems can be solved by an aqueous coating composition comprising a specific acrylic resin and/or polyester resin, a specific polycarbonate resin and a curing agent as a main component. Thus, the present invention has been completed.

The main object of the present invention is to provide an aqueous coating composition which further improves coating workability (pinhole resistance) of the intercoating composition or aqueous metallic base coating composition and which improves smoothness and water resistance of the resulting coat.

This object as well as other objects and advantages of the present invention will become apparent to those skilled in the art from the following description.

That is, the present invention provides an aqueous coating composition which comprises: (A) an acrylic resin and/or a polyester resin having an acid value of 10 to 100, a hydroxyl value of 20 to 300 and a number average-molecular weight of 1,000 to 50,000; (B) a polycarbonate resin having a number average-molecular weight of 1,000 to 10,000 which contains a hydroxyl group at the terminal end; and (C) a curing agent.

DETAILE DESCRIPTION OF THE INVENTION

The aqueous coating composition of the present invention is characterized in that a specific polycarbonate resin (B) is used in an aqueous coating. Regarding a relation among the components (A), (B) and (C), the component (A) is a resin containing a hydrophilic group and it plays a role in being dissolved in water or stably dispersed in water without causing layer separation and sedimentation, and the component (C) plays a role in subjecting to a crosslinking reaction with the resin (A) under heating condition after coating, but stability in water and compatibility on heating reaction of the components (A) and (C) are normally inferior.

To the contrary, the component (B) of the present invention plays an extremely characteristic role in helping uniform water-solubilization or water dispersion stabilization in water of the components (A) and (C) and proceeding compatibilization during heating reaction and the following crosslinking reaction in an uniform state.

A solubility parameter (Sp value) is used for explaining such compatibility, and a polycarbonate resin (B) having a Sp value of 9.5 to 12.0 is preferred. Further, the solubility parameter ($\delta Sp$) can be determined by the formula:

$$\delta Sp = (\sqrt{(Vml)} + \sqrt{(Vmh \cdot \delta mh)}) \times (\sqrt{(Vml)} + \sqrt{(Vmh)})$$

(wherein, ml is a low Sp solvent, mh is a high Sp solvent, $\delta$ is a solubility parameter and V is a molecular volume in turbidity point) described in K. W. SUH, J. M. CORBETT; Journal of Applied Polymers Science 12, 2359 (1968). This is a quantitative expression of polarity of the substance.

That is, regarding a point which lacks any one of these components, pinhole is liable to be arisen on curing with heating. Further, smoothness and water resistance are not sufficient. On the other hand, the coating composition comprising all of the components (A), (B) and (C) of the present invention provides a coated film wherein such the defect is improved.

The components (A) to (C) which constitute the coating composition of the present invention will be explained in detail.

Component (A)

The acrylic resin of the component (A) is a resin having an acid value of 10 to 100, a hydroxyl value of 20 to 300 and an average-number molecular weight of 1,000 to 50,000, which is obtained by copolymerizing an acidic group-containing ethylenic monomer, a hydroxyl group-containing ethylenic monomer and another ethylenic monomer. The preferred acrylic resin is a copolymer comprising 5 to 40% by weight of an amide group-containing ethylenic monomer, 3 to 15% by weight of an acidic group-containing ethylenic monomer, 10 to 40% by weight of a hydroxyl group-containing ethylenic monomer and the residual amount of an ethylenic monomer other than the above mentioned three monomers.

Examples of the amide group-containing ethylenic monomer include acrylamide, methacrylamide, N,N-dimethylacrylamide, N,N-dimethylmethacrylamide, N,N-dibutylacrylamide, N,N-dibutylmethacrylamide, N,N-dioctylacrylamide, N,N-dioctylmethacrylamide, N-monobutylacrylamide, N-monobutylmethacrylamide, N-monooctylacrylamide, N-monooctylmethacrylamide and the like.

The acidic group-containing ethylenic monomer contains carboxyl group, sulfonic group and the like. Examples of the carboxylic group-containing monomer include styrene derivatives (e.g. 3-vinylsalicylic acid, 3-vinylacetylsalicylic acid, etc.) and (meth)acrylic acid derivatives (e.g. acrylic acid, methacrylic acid, crotonic acid, isocrotonic acid, etc.). Examples of the sulfonic group-containing ethylenic monomer include p-vinylbenzenesulfonic acid, 2-acrylamidepropanesulfonic acid and the like.

The acidic group-containing ethylenic monomer may be half esters, half amides and half thioesters of dibasic acid monomers. Example thereof include half esters, half amides and half thioesters of maleic acid, fumaric acid and itaconic acid. Examples of an alcohol which forms a half ester include those having 1 to 12 carbon atoms, e.g. methanol, ethanol, propanol, butanol, methyl cellosolve, ethyl cellosolve, dimethylaminoethanol, diethylaminoethanol, acetol, allyl alcohol, propargyl alcohol and the like. Preferred are butanol, dimethylaminoethanol, diethylaminoethanol, acetol, allyl alcohol and propargyl alcohol. Examples of a mercaptan which forms a half thioester include those having 1 to 12 carbon atoms, e.g. ethylmercaptan, propylmercaptan, butylmercaptan and the like. Examples of an amine which forms a half amide include those having 1 to 12 carbon atoms, e.g. ethylamine, diethylamine, butylamine, dibutylamine, cyclohexylamine, aniline, naphthylamine and the like. Among them, the half thioester compounds are not suitable because of their odor, and those which are suitably used are half esters and half amides. Half-esterification, half-thioesterification and halfamidation may be conducted at a temperature of room temperature to 120° C. in the presence or absence of tertiary amine as a catalyst according to a normal method.

Examples of the hydroxyl group-containing ethylenic monomer include 2-hydroxyethyl acrylate, 2-hydroxypropyl acrylate, 2-hydroxyethyl methacrylate, 2-hydroxypropyl methacrylate, 2,4-dihydroxy-4'-vinylbenzophenone, N-(2-hydroxyethyl)acrylamide, N-(2-hydroxyethyl)methacrylamide and the like.

The other ethylenic monomer is an ethylenic monomer containing no reactive functional group, and examples thereof include styrenes (e.g. styrene, α-methylstyrene, etc.), acrylates (e.g. methyl acryate, ethyl acrylate, butyl acrylate, 2-ethylhexyl acrylate, etc.), methacrylates (e.g. methyl methacrylate, ethyl methacrylate, butyl methacrylate, isobutyl methacrylate, p-butyl methacrylate, etc.), nitriles (e.g. acrylonitrile, etc.), olefins (e.g. ethylene, propylene, etc.) and the like.

The amount of the amide group-containing ethylenic monomer is 5 to 40% by weight, preferably 8 to 30% by weight. When the amount is smaller than 5% by weight, the flake metal pigment is not sufficiently oriented, which results in deterioration of appearance. On the other hand, when the amount exceeds 40% by weight, water resistance of the resulting coat is deteriorated. The amount of the acidic group-containing ethylenic monomer is 3 to 15% by weight, preferably 5 to 13% by weight. When the amount is smaller than 3% by weight, water dispersion properties become inferior. On the other hand, when the amount exceeds 15% by weight, water resistance of the resulting coat is deteriorated. The amount of the hydroxyl group-containing ethylenic monomer is 10 to 40% by weight, preferably 13 to 30% by weight. When the amount is smaller than 10% by weight, curing properties of the film become inferior. On the other hand, when the amount exceeds 40% by weight, water resistance of the coat is deteriorated. Further, the amount (% by weight) is based on the total weight of the monomer.

As the polyester resin of the component (A), there can be used an oil-free polyester resin obtained by condensing a polyhydric alcohol component with a polybasic acid component, or an oil-modified polyester resin obtained by reacting the polyhydric alcohol component and polybasic acid component with an oil component as a mixture of one or more sorts of castor oil, dehydrated castor oil, tung oil, safflower oil, soybean oil, linseed oil, tall oil, coconut oil or a fatty acid thereof. Further, a polyester resin obtained by grafting an acrylic resin or vinyl resin can also be used as the component (A). Examples of the polyhydric alcohol include ethylene glycol, diethylene glycol, propylene glycol, butanediol, pentanediol, 2,2-dimethylpropanediol, glycerine, trimethylolpropane, pentaerythritol and the like. If necessary, a monohydric alcohol or a monoepoxy compound containing one glycidyl group in a molecule (e.g. "CARDINILA E" (trade name), manufactured by Shell Chemical Co., Ltd.) may be used in combination. Examples of the polybasic acid include phthalic anhydride, isophthalic acid, tetrahydrophthalic anhydride, hexahydrophthalic anhydride, maleic anhydride, succinic anhydride, adipic acid, sebatic acid, trimellitic anhydride, pyromellitic anhydride and the like. If necessary, monobasic acids such as benzoic acid, t-butylbenzoic acid, etc. may be used in combination.

Further, it is preferred to use an urethane-modified polyester resin as the component (A), because it is superior in storage stability, pinhole resistance, definition properties, tipping resistance and the like.

The component (A) above described has an acid value of 10 to 100, preferably 30 to 80 and a hydroxyl value of 20 to 300, preferably 50 to 200. When the acid value is smaller than 10, water solubilization becomes insufficient. On the other hand, when the acid value exceeds 100, water resistance of the coat is deteriorated, and it is not preferred. Further, when the hydroxyl value is smaller than 20, curing characteristics of the coat are insufficient. On the other hand, when the hydroxyl value exceeds 300, water resistance of the coat is deteriorated, and it is not preferred.

Further, the number-average molecular weight of the component (A) is 1,000 to 50,000, preferably 2,000 to 30,000. When the number-average molecular weight is smaller than 1,000, hardness and water resistance of the coat are deteriorated. On the other hand, when the number-average molecular weight exceeds 50,000, atomization on spray coating becomes inferior, which results in deterioration of smoothness of the coat, and it is not preferred.

It can be easily water-solubilized by neutralizing (e.g. not less than 50%) the carboxyl group of the component (A) with a basic substance. Examples of the basic substance used herein include ammonia, methylamine, ethylamine, dimethylamine, diethylamine, trimethylamine, triethylamine, dimethyl ethanolamine, diethanolamine, triethanolamine and the like. Among them, diethanolamine, dimethyl ethanolamine and trimethanolamine are preferred.

Component (B)

The component (B) is a polycarbonate resin having a number-average molecular weight of 1,000 to 10,000, preferably 2,000 to 6,000, which contains a hydroxyl group at the terminal end. When the number-average molecular weight of the polycarbonate resin used in the present invention is smaller than 1,000, pinhole resistance and water resistance of the coat are deteriorated. On the other hand, when the number-average molecular weight exceeds 10,000, pinhole resistance of the coat is also deteriorated and smoothness thereof is particularly deteriorated.

The preferable polycarbonate resin is one obtained by reacting a carbonate monomer selected from a dialkyl carbonate or an ethylene carbonate with a straight-chain dihydric alcohol, a branched-chain dihydric alcohol and a polyhydric alcohol having three or more hydroxyl groups, wherein the amount of the branched-chain dihydric alcohol is at least 10 molar % based on the total amount of the alcohol and the amount of the polyhydric alcohol having three or more hydroxyl groups is not less than 10 molar %. When the amount of the branched-chain dihydric alcohol is smaller than 10 molar % based on the total amount of the alcohol, the polycarbonate resin is crystallized. On the other hand, when the amount of the polyhydric alcohol having three or more hydroxyl groups is smaller than 10 molar %, curing characteristics and water resistance of a coating are slightly inferior.

Typical examples of the branched-chain dihydric alcohol include 2-methyl-1,3-propanediol, 3-methyl-1,5-pentanediol, neopentyl glycol, 2,2-diethyl-1,3-propanediol, 2-butyl-2-ethyl-1,3-propanediol, 2-methyl- 1,8-octanediol, 2,2,4-trimethyl-1,3-pentanediol, 2-ethyl- 1,3-hexanediol, 1,4-cyclohexanedimethanol, tricyclodecanemethanol and the like.

Typical examples of the polyhydric alcohol having three or more hydroxyl groups used in the coating composition of the present invention include glycerine, trimethylolethane, trimethylolpropane and a dimer of trimethylolpropane, pentaerythritol and the like.

Typical examples of the straight-chain dihydric alcohol include 1,3-propylene glycol, 1,4-butanediol, 1,5-pentanediol, 1,6-hexanediol, 1,8-octanediol, 1,9-nonanediol, 1,10-decanediol and the like.

Component (C)

The component (C) used in the coating composition of the present invention is a curing agent (such as an amino resin and a blocked polyisocyanate). Examples of the amino resin include di-, tri-, tetra-, penta- and hexamethylolmelamine and alkyl etherificated products thereof (examples of the alkyl include methyl, ethyl, propyl, isopropyl, butyl, isobutyl, etc.), urine-formaldehyde condensates, urine-melamine condensates and the like.

The blocked polyisocyanate is a polyisocyanate which is blocked with a blocking agent and unblocked at an elevated temperature. Examples of the polyisocyanates are aliphatic diisocyanates, such as trimethylene diisocyanate, hexamethylene diisocyanate and propylene diisocyanate; aromatic diisocyanates, such as phenylene diisocyanate and naphthalene diisocyanate; aliphatic-aromatic diisocyanates, such as toluene diisocyanate and tolylene diisocyanate; tri- or more polyisocyanates, such as triphenylmethane triisocyanates, dimer or trimer of tolylene diisocyanate; and the like. Examples of the blocking agents are alcohols, such as methyl alcohol, ethyl alcohols; tertiary amines, such as diethanolamine; lactams, such as caprolactam; oximes, such as methyl ethyl ketooxime and acetone oxime; and the like.

Among them, the melamine resin is preferable and suitable examples thereof include hydrophilic melamines and/or hydrophobic melamines, such as CYMEL 303, CYMEL 325, CYMEL 1156 (manufactured by American Cyanamide Co.); YUBAN 20N, YUBAN 20SB, YUBAN 128 (manufactured by Mitsui Toatsu Chemicals, Inc.); SUMIMAL M-50W, SUMIMAL M-40N, SUMIMAL M-30W (manufactured by Sumitomo Chemical Co., Ltd.) and the like. They are used alone or in combination thereof.

The amount of the component (A) is 35 to 70% by weight, preferably 40 to 60% by weight, that of the component (B) is 5 to 50% by weight, preferably 10 to 35% by weight and that of the component (C) is 10 to 40% by weight, preferably 20 to 30% by weight, based on the weight of the solid content of the coating composition. When the amount of the component (A) is smaller than 35% by weight, stability of the aqueous coating composition is deteriorated and the viscosity of the coating composition becomes dramatically high and, further, aggregation and sedimentation are arisen. On the other hand, when the amount exceeds 70% by weight, curing characteristics of the composition are deteriorated and water resistance of the cured film is also inferior. When the amount of the component (B) is smaller than 5% by weight, no improvement effect of the objective coating workability (pinhole resistance and sagging resistance) is obtained and the smoothness is inferior. On the other hand, when the amount exceeds 50% by weight, the hardness of the coating becomes too low. When the amount of the component (C) is smaller than 10% by weight, curing characteristics are insufficient. On the other hand, when the amount exceeds 40% by weight, the coating becomes too hard and it becomes brittle.

Component (D)

The coating composition of the present invention may further contain acrylic resin particles having a particle size of 0.01 to 1.0 µm as a component (D). The particles may be three-dimentionary crosslinked. When the particle size is smaller than 0.01 µm, the improvement effect of workability (sagging resistance) is insufficient. On the other hand, when the particle size exceeds 1.0 µm, an appearance of the resulting coating becomes inferior. It is preferred that the acrylic resin particles have carboxyl groups and have an acid value of 5 or more. When the acid value is smaller than 5, the improvement effect of workability (sagging resistance) is insufficient. The acid value may preferably be 80 or less. When the acid value exceeds 80, water solubility is enhanced and particle properties are liable to be lost. Particularly preferred range of the acid value is 10 to 70. The acrylic resin particles are preferably provided in the form of a water dispersant.

In order to produce of the resin particles (D) containing a carboxyl group of the present invention, a monomer (I) containing at least one carboxyl group in a molecule is used. Examples of the monomer include styrene derivatives (such as p-carboxyl styrene), (meth)acrylic acid derivatives, unsaturated dibasic acids and the like, as described above. Preferred are (meth)acrylic acid derivatives, more preferably acrylic acid, methacrylic acid, acrylic dimer and α-hydro-ω-((1-oxo- 2-propenyl)oxy) poly(oxy(1-oxo-1,6-hexanediyl).

At least one sort of another monomer (II) without a carboxyl group is used, in addition to the monomer containing at least one carboxyl group in a molecule. This monomer is an unsaturated compound which can be radically copolymerized with the unsaturated compound (I) having a carboxyl group. Examples of the monomer (II) include (meth)acrylate compounds containing no reactive functional group (e.g. methyl acrylate, methyl methacrylate, ethyl acrylate, ethyl methacrylate, n-butyl acrylate, n-butyl methacrylate, isobutyl acrylate, t-butyl acrylate, 2-ethylhexyl acrylate, 2-ethylhexyl methacrylate, layryl methacrylate, phenyl acrylate, etc.), polymerizable aromatic compounds (e.g. styrene, α-methylstyrene, vinylketone, t-butylstyrene, parachlorostyrene, vinylnaphthalene, etc.), hydroxyl group-containing unsaturated compounds (e.g. 2-hydroxyethyl acrylate, 2-hydroxyethyl methacrylate, hydroxypropyl acrylate, hydroxypropyl methacrylate, hydroxybutyl acrylate, hydroxybutyl methacrylate, allyl alcohol, methacryl alcohol, etc.), polymerizable amide compounds (e.g. acrylamide, methacrylamide, N-methylolmethacrylamide, N-methoxymethylacrylamide, etc.), polymerizable nitrile compounds (e.g. acrylonitrile, methacrylonitrile, etc.), vinyl halide compounds (e.g. vinyl chloride, vinyl bromide, vinyl fluoride, etc.), α-olefin compounds (e.g. ethylene, propylene, etc.), vinyl compounds (e.g. vinyl acetate, vinyl propionate, etc.), diene compounds (e.g. butadiene, isoprene, etc.) and the like.

In order to synthesize three-dimensionally crosslinked resin particles, a compound containing two or more radical-polymerizable ethylenically unsaturated groups in a molecule can be used as the other monomer (II). Examples thereof include polymerizable unsaturated monocarboxylic ester compounds of polyhydric alcohol (e.g. ethylene glycol diacrylate, ethylene glycol dimethacrylate, triethylene glycol dimethacrylate, tetraethylene glycol dimethacrylate, 1,3-butyrene glycol dimethacrylate, trimethylolpropane triacrylate, trimethylolpropane trimethacrylate, 1,4-butanediol diacrylate, neopentyl glycol diacrylate, neopentyl glycol dimethacrylate, 1,6-hexanediol diacrylate, 1,6-hexanediol dimethacrylate, pentaerythritol diacrylate, pentaerythritol dimethacrylate, pentaerythritol triacrylate, pentaerythritol trimethacrylate, pentaerythritol tetraacrylate, pentaerythritol tetramethacrylate, glycerol diacrylate, glycerol dimethacrylate, glycerol acryloxydimethacrylate, 1,1,1-trishydroxymethylethane diacrylate, 1,1,1-trishydroxymethylethane dimethacrylate, 1,1,1-trishydroxymethylethane triacrylate, 1,1,1-trishydroxymethylethane trimethacrylate, 1,1,1-trishydroxymethylpropane diacrylate, 1,1,1-trishydroxymethylpropane dimethacrylate, etc.), polymerizable unsaturated alcohol ester compounds of polyhydric acid (e.g. diallyl terephthalate, diallyl phthalate, triallyl trimellitate, etc), aromatic compounds substituted with two or more vinyl groups (e.g. divinylbenzene, etc.), adducts of an epoxy group-containing ethylenically unsaturated monomer and a carboxyl group-containing ethylenically unsaturated monomer (e.g. reaction products of glycidyl acrylate and glycidyl methacrylate with acrylic acid, methacrylic acid, crotonic acid and maleic acid, etc.) and the like. Diene compounds have two ethylenically unsaturated groups, which, however, act as single polymerizable group in usual polymerization process with one unsaturated group remaining in polymer backbone. Accordingly, the diene compounds are classified as a monomer having one polymerizable group.

These monomers are used alone or in combination thereof.

The amount of the monomer (I) containing at least one carboxyl group in a molecule is 1 to 50% by weight, preferably 10 to 40% by weight, and that of the other monomer (II) is 99 to 50% by weight, preferably 90 to 60% by weight, based on the total weight of the unsaturated compound used for producing the water dispersant (D) of the resin particles containing a carboxyl group.

The water dispersant (D) can be produced by emulsion-polymerizing the above mentioned monomers (I) and (II). The emulsion polymerization is conducted in water, if necessary, in an aqueous medium which may contain an organic solvent such as alcohol, using a polymerization initiator.

Examples of the polymerization initiator to be used include oily azo compounds (e.g. azobisisobutyronitrile, 2,2'-azobis(2-methylbutyronitrile), 2,2'-azobis(2,4-dimethylvaleronitrile, etc.), aqueous compounds (e.g. anionic 4,4'-azobis (4-cyanovaleric acid), cationic 2,2'-azobis( 2-methylpropionamidine), etc.) and the like. Examples of the redox polymerization initiator include oily peroxides (e.g. benzoyl peroxide, parachlorobenzoyl peroxide, lauroyl peroxide, t-butyl perbenzoate, etc.), aqueous peroxides (e.g. potassium persulfate, ammonium peroxide, etc.) and the like.

The reaction temperature is decided according to a kind of the initiator. For example, the reaction temperature is 60° to 90° C. in case of an azo initiator and is 30° to 70° C. in case of a redox initiator. The reaction time is 1 to 8 hours. The amount of the initiator is 0.1 to 5% by weight, preferably 0.5 to 2% by weight, based on the total amount of the unsaturated compound.

The emulsion polymerization is fundamentally conducted by a method of dropping the unsaturated compound. Further, it is also conducted by a method of dropping those which are pre-emulsified using the unsaturated compound, water and emulsifier.

As the emulsifier, there can be used those which are normally used, but reactive emulsifiers such as RA-1022 (manufactured by Japan Emulsifier Co., Ltd.), ELEMINOL JS-2 (manufactured by Sanyo Kasei Co., Ltd.), AQUALON HS-10 (manufactured by Daiichi Kogyo Seiyaku Co., Ltd.), etc. are preferred. The reactive emulsifier is a surfactant having emulsifying ability in which at least one radically polymerizable group is present, for example an anionic, cationic or nonionic surfactant having a (meth)acryloyl group or an allyl group.

Further, the molecular weight can be adjusted using mercaptan compounds (e.g. lauryl mercaptan, etc.) or other compounds (e.g. α-methylstyrene dimer, etc.) as a chain transfer agent.

The component (D) may be formulated in the amount of 3 to 70 part by weight, preferably 5 to 55 part by weight, based on 100 parts by weight of the solid content of the components (A) to (C). When the amount is smaller than 3 part, no improvement effect of the coating workability (sagging resistance) is obtained. On the other hand, when the amount exceeds 70 parts by weight, smoothness of the resulting coating is deteriorated.

Others

Further, other additives such as pigments, metal pigments, micas, defoamers, dispersants, surface adjustors, curing catalysts (acid catalyst), etc. may be added to the coating composition of the present invention. It is desired for an intercoating composition that inorganic pigments (e.g. barium sulfate, calcium carbonate, clay, titanium oxide, etc.) are used in combination with coloring pigments in the intercoating.

The present invention relates to an aqueous coating composition comprising water (preferably, deionized water) as a medium. However, a small amount of organic solvents (e.g. ether alcohols such as ethylene glycol monomethyl ether, ethylene glycol monoethyl ether, ethylene glycol monobutyl ether, etc.; alcohols such as methanol, ethanol, isopropano, n-butanol, sec-butanol, t-butanol etc.; esters; ketones, etc.) may be used, if necessary.

A metallic coating having good appearance can be obtained by a so-called two coat/one bake coating process which comprises coating a base paint in which a metal pigment is formulated, followed by wet-on-wet coating a clear paint without curing the base coating, and then curing the base coating and clear coating, simultaneously. The coating composition of the present invention is suitable for the base paint. Examples of the clear coating to be used in the process include melamine curing system (such as, acryl/melamine system), acid/epoxy curing system, acryl/isocyanate curing system, hydroxyl group/epoxy group/half ester of acid anhydride curing system and the like.

Among them, the melamine curing system and hydroxyl group/epoxy group/half ester of acid anhydride curing system are preferred. As the melamine curing system, a composition comprising a melamine resin as a curing agent and a acrylic resin containing a hydroxyl group as a main resin is popular. The hydroxyl group/epoxy group/half ester of acid anhydride curing system is a newly developed curing system having excellent acid resistance and is a curing system comprising a half ester of an acid anhydride group which is present in a polymer, a hydroxyl group and an epoxy group, which is described in detail in Japanese Laid-Open Patent Publication Nos. 2-45577 and 3-287650 (respectively corresponding to Australia Patent 613,780 and U.S. Pat. No. 5,270,392 of which description is herein incorporated).

The clear coating may also be a powder paint. As the powder paint, there can be used a thermoplastic powder paint and thermosetting powder paint. In view of physical properties of the coating, the thermosetting powder paint is preferred. Examples of the thermosetting powder paint include epoxy powder paint, acrylic powder paint and polyester powder paint. Among them, the acrylic powder paint having good weathering resistance is preferred. As the functional group monomer of the acrylic resin used in the acrylic powder paint, there is a vinyl monomer containing a glycidyl group, hydroxyl group and carboxyl group. Examples thereof include glycidyl(meth) acrylate, methylglycidyl(meth)acrylate, hydroxyethyl (meth)acrylate, hydroxybutyl(meth)acrylate, acrylic acid, methacrylic acid and the like. Examples of the curing agent used in combination include polyhydric carboxylic acid, phenol, amine, blocked isocyanate, urethodione group-containing blocked isocyanate, alkoxyalkyl glycol, epoxy compound, hydroxyalkylamide compound and the like. A system of epoxy-containing acrylic resin/polyhydric carboxylic acid, which shows good appearance because no volatile components is produced in case of curing and cause little color change towards yellow, is preferred.

In the aqueous coating composition of the present invention, by using the polycarbonate resin as the component (B) in combination, the concentration of the nonvolatile content on coating becomes high and sprayablity on spray coating becomes good. Further, since the polycarbonate resin contains no hydrophilic group such as carboxyl group, it exhibits good water separation (bleeding of water from the coat) and pinhole phenomenon due to bumping of water on curing is extremely decreased, thereby improving pinhole resistance as coating workability. In addition, the acrylic resin particles containing the carboxyl group interact with the amide group contained in the film-forming polymer so that the viscosity becomes high, thereby causing no sagging even in case of the vertical coating surface under the condition of high humidity. Further, since the polycarbonate resin causes deterioration of the viscosity of the surface layer of the basecoat, smoothness of the coat is improved.

As described above, according to the present invention, there is provided an aqueous coating composition superior in coating workability (e.g. pinhole resistance, sagging resistance, etc.) under the condition of high humidity as well as smoothness of the coat.

EXAMPLES

The following Examples, Comparative Examples and Production Examples further illustrate the present invention in detail but are not to be construed to limit the scope thereof. In the Examples, Comparative Examples and Production Examples, "part" is by weight unless otherwise stated.

Production Example 1 (Polyester Resin)

20.51 Parts of ethylene glycol, 12.91 parts of trimethylolpropane and 51.70 parts of phthalic anhydride were mixed and the mixture was subjected to an esterification reaction at 160° to 220° C. for 5 hours. Then, 14.88 parts of trimellitic anhydride was further added to the reaction product, which was reacted at 180° C. for an hour to obtain a polyester resin having an acid value of 50, a hydroxyl value of 60 and a number-average molecular weight of 2,000.

The polyester resin was neutralized with ethanolamine to obtain an aqueous polyester resin varnish (I) having a neutralization degree of 80% and a nonvolatile content of 35% by weight.

Production Example 2 (Alkyd Resin)

22.92 Parts of coconut oil fatty acid, 21.36 parts of trimethylolpropane, 14.30 parts of neopentyl glycol and 22.23 parts of phthalic anhydride were mixed and the mixture was subjected to an esterification reaction at 160° to 220° C. for 5 hours. Then, 19.2 parts of trimellitic anhydride was further added to the reaction product, which was reacted at 180° C. for an hour to obtain an alkyd resin having an acid value of 60, a hydroxyl value of 80 and a number-average molecular weight of 1,500.

The alkyd resin was neutralized with dimethylethanolamine to obtain an aqueous alkyd resin varnish (II) having a neutralization degree of 80% and a nonvolatile content of 35% by weight.

Production Example 3 (Acrylic Resin)

76 Parts of ethylene glycol monomethyl ether was charged into a reaction vessel, to which was added 60 parts of a monomer mixed solution comprising 45 parts of styrene, 63 parts of methyl methacrylate, 48 parts of 2-hydroxyethyl methacrylate, 117 parts of n-butyl acrylate, 27 parts of methacrylic acid and 3 parts of azobisisobutyronitrile, and the mixture was heated to a temperature of 120° C. with stirring. Immediately after the temperature became 120° C., 243 parts of the monomer mixed solution was added dropwise at an uniform rate over 3 hours and then reacted at the same temperature for an hour to obtain an acrylic resin having an acid value of 58, a hydroxyl value of 70 and a number-average molecular weight of 10,000.

The acrylic resin was neutralized with dimethylethanolamine to obtain an aqueous acrylic resin varnish (III) having a neutralization degree of 80% and a nonvolatile content of 50% by weight.

Production Example 4 (Amide Group-Containing Acrylic Resin)

76 Parts of ethylene glycol monomethyl ether was charged into a reaction vessel, to which was added 60 parts of a monomer mixed solution comprising 15 parts of styrene, 30 parts of acrylamide, 63 parts of methyl methacrylate, 48 parts of 2-hydroxyethyl methacrylate, 117 parts of n-butyl acrylate, 27 parts of methacrylic acid and 3 parts of azobisisobutyronitrile, and the mixture was heated to a temperature of 120° C. with stirring. Immediately after the temperature became 120° C., 243 parts of the monomer mixed solution was added dropwise at an uniform rate over 3 hours and then reacted at the same temperature for an hour to obtain an acrylic resin having an acid value of 58, a hydroxyl value of 70 and a number-average molecular weight of 12,000.

The acrylic resin was neutralized with dimethylethanolamine to obtain an aqueous acrylic resin varnish (IV) having a neutralization degree of 80% and a nonvolatile content of 50% by weight.

Production Example 5 (Polycarbonate Resin)

To a glass reaction vessel equipped with a stirrer, a thermometer and a fractioning column, 1000 parts of dimethyl carbonate (11.1 moles), 650 parts of 3-methyl- 1,5-pentanediol (5.5 moles) and 1 part of tetraisopropyl titanate as a catalyst were added and mixed. Then, the mixture was reacted at 100° C. for 5 hours under normal pressure and heated to 200° C. over 5 hours to distill off methanol produced by the reaction. After methanol has been completely distilled off, the reaction was conducted for additional 2 hours under reduced pressure at 10 mmHg or less. 99 Parts of a dimer of trimethylolpropane (0.40 moles) was added to 500 parts of the reaction product, which was reacted at 200° C. for additional 4 hours to obtain a polycarbonate resin (V) having a number-average molecular weight of 2,350 and a hydroxyl value of 154.

Production Examples 6 to 10 (Polycarbonate Resin)

According to the same operation as that described in Production Example 5, polycarbonate resins (VI) to (X) were obtained, using the formulations of Table 1. The characteristics of the resulting polycarbonate resins are shown in Table 2.

TABLE 1

| Production Example No. | Resin | DMC | Branched-chain dihydric alcohol | | | Straight-chain dihydric alcohol | | Polyhydric alcohol | |
|---|---|---|---|---|---|---|---|---|---|
| | | | MPD | MOD | BEPD | HD | ND | TMP | D-TMP |
| 5 | V | 1000 | 650 (86 molar %) | | | | | | 215 (14 molar %) |
| 6 | VI | 1000 | | 232 (29 molar %) | | | 432 (52 molar %) | | 250 (19 molar %) |
| 7 | VII | 1000 | | | 886 (82 molar %) | | | 165 (18 molar %) | |
| 8 | VIII | 1000 | | | | 1000 (100 molar %) | | | |
| 9 | IX | 1000 | | | | | 500 (100 molar %) | | |
| 10 | X | 1000 | 33 (5 molar %) | | | 590 (90 molar %) | | 37 (5 molar %) | |

DMC   Dimethyl carbonate
MPD   3-Methylpentanediol
MOD   2-Methyloctanediol
BEPD  2-Butyl,2-ethylpropanediol
HD    1,6-Hexanediol
ND    1,9-Nonanediol
TMP   Trimethylolpropane
D-TMP Dimer of trimethylolpropane

TABLE 2

| Production Example No. | Resin | Molecular weight | OHV | Molar % of branched-chain dihydric alcohol | Molar % of polyhydric alcohol |
|---|---|---|---|---|---|
| 5 | V | 2350 | 154 | 86 | 14 |
| 6 | VI | 3500 | 100 | 29 | 19 |
| 7 | VII | 4750 | 55 | 83 | 18 |
| 8 | VIII | 500 | 220 | 0 | 0 |
| 9 | IX | 13000 | 12 | 0 | 0 |
| 10 | X | 2500 | 55 | 5 | 5 |

EXAMPLES 1 TO 6 AND COMPARATIVE EXAMPLES 1 TO 3

According to the formulation shown in Table 3, an aqueous intercoating paint was produced. As a pigment, 80 parts of rutile titanium oxide, 20 parts of barium sulfate and 0.2 part of carbon black were formulated based on 100 parts of the total solid content of the components (A), (B) and (C).

These pigments were premixed with the component (A), deionized water and a defoamer, and the premix was subjected to a dispersion treatment in a glass beads medium for 40 minutes, using a paint conditioner.

obtain a topcoating. The final surface texture and water resistance of the top-coated steel plate were evaluated. The results are shown in Table 4.

TABLE 3

|  |  | Example No. |  |  |  |  |  | Comparative Example No. |  |  |
|---|---|---|---|---|---|---|---|---|---|---|
|  |  | 1 | 2 | 3 | 4 | 5 | 6 | 1 | 2 | 3 |
| (A) Component | Kind of resin | PE(I) | PE(I) | PE(I) | PE(I) | AL(II) | PE(I) | PE(I) | PE(I) | PE(I) |
|  | Amount | 60 | 60 | 65 | 40 | 65 | 60 | 75 | 60 | 60 |
| (B) Component | Kind of resin | PC(V) | PC(VI) | PC(VII) | PC(V) | PC(V) | PC(X) | — | PC(VIII) | PC(IX) |
|  | Amount | 15 | 15 | 10 | 35 | 10 | 15 |  | 15 | 15 |
| (C) Component | Kind of resin | C-303 | C-303 | C-303 | C-303 | C-303 | C-303 | C-303 | C-303 | C-303 |
|  | Amount | 25 | 25 | 25 | 25 | 25 | 25 | 25 | 25 | 25 |

PE: Abbreviation for polyester resin
C-303: Melamine resin (manufactured by Mitsui Toatsu Chemicals, Inc.)
AL: Abbreviation for alkyd resin
PC: Abbreviation for polycarbonate resin To the resulting aqueous intercoating compositions of Examples 1 to 6 or Comparative Examples 1 to 3, 1 part of NACURE 5225 (amine-blocked acid catalyst, manufactured by King Industries Inc.) was added, respectively. Thereafter,

TABLE 4

|  | Example No. |  |  |  |  |  | Comparative Example No. |  |  |
|---|---|---|---|---|---|---|---|---|---|
|  | 1 | 2 | 3 | 4 | 5 | 6 | 1 | 2 | 3 |
| Pinhole critical film thickness (μm) | 60< | 60< | 60< | 60< | 60< | 55 | 30 | 60< | 50 |
| Sagging critical film thickness (μm) | 45 | 45 | 45 | 45 | 45 | 45 | 45 | 30 | 45 |
| Smoothness of intercoating | o | o | o | o | o | o | Λ | o | x |
| Smoothness of topcoating | o | o | o | o | o | Λ | Λ | Λ | x |
| Water resistance | o | o | o | o | o | x | x | x | o |

Pinhole critical film thickness: In a coated plate having a gradient film thickness wherein the film thickness of the thin-film part is 15 μm and that of the thick-film part is 70 μm, the maximum film thickness at which no coating defect (pinhole) is arisen was taken as the pinhole critical film thickness.
Sagging critical film thickness: In a coated plate having a gradient film thickness wherein the film thickness of the thin-film part is 15 μm and that of the thick-film part is 70 μm, the maximum film thickness at which no coating defect (sagging) is arisen was taken as the sagging critical film thickness.
Coating smoothness: It was visually evaluated according to the following criteria:
o: Good smoothness
Λ: Smoothness is slightly inferior (round is arisen)
x: Inferior smoothness (pulled surface, orange peel surface)
Water resistance: A topcoated steel plate was dipped in hot water at 40° C. for 240 hours and allowed to stand at 20° C. at a humidity of 75% for 24 hours. Then, the plate was subjected to a cross hatch (1 mm × 1 mm, 100 crosses) tape peeling test to evaluate water resistance by the residual % of the coating.
o: 100/100 (No peeling)
x: 99 or less/100 the respective mixtures were diluted with deionized water to adjust the viscosity to 30 second/#4 Ford cup (25° C.). The intercoating solution was provided on a steel plate, on which an electrodeposition coating had been formed in advance, by a spray coating such that the dry film thickness became 15 to 70 μm and then the coated steel plate was baked at 150° C. for 30 minutes. Thereafter, the final surface texture of the intercoating was evaluated. The coating conditions were adjusted to a temperature of 25° C. and a humidity of 70%.

Then, a melamine-alkyd topcoating ("ORGA G25 WHITE", manufactured by Nihon Paint Co.) was coated on the intercoating such that the dry film thickness became 35 to 45 μm, similarly, and baked at 140° for 30 minutes to

EXAMPLES 7 TO 12 AND COMPARATIVE EXAMPLES 4 TO 6

According to the formulation shown in Table 5, an aqueous metallic base paint was produced.

As a pigment, 12 parts of an aluminum pigment was formulated based on 100 parts of the total solid content of the components (A), (B) and (C). The aluminum pigment (ALPASTE 7160N, amount of aluminum metal pigment: 65%, manufactured by Toyo Aluminum K.K.) was uniformly premixed with the component (C) and 2 parts of 2isostearyl acid phosphate (PHOSREX A-180L, manufactured by Sakai Kagaku Co., Ltd.) and the resulting solution was used as an aluminum pigment solution.

TABLE 5

|  |  | Example No. |  |  |  |  |  | Comparative Example No. |  |  |
|---|---|---|---|---|---|---|---|---|---|---|
|  |  | 7 | 8 | 9 | 10 | 11 | 12 | 4 | 5 | 6 |
| (A) Component | Kind of resin | AC(IV) | AC(IV) | AC(IV) | AC(IV) | AC(III) | AC(III) | AC(III) | AC(III) | AC(III) |
|  | Amount | 60 | 60 | 65 | 40 | 65 | 60 | 755 | 60 | 60 |
| (B) Component | Kind of resin | PC(V) | PC(VI) | PC(VII) | PC(V) | PC(V) | PC(X) | — | PC(VIII) | PC(IX) |
|  | Amount | 15 | 15 | 10 | 35 | 10 | 15 |  | 15 | 15 |
| (C) Component | Kind of resin | C-303 | C-303 | C-303 | C-303 | C-303 | C-303 | C-303 | C-303 | C-303 |
|  | Amount | 25 | 25 | 25 | 25 | 25 | 25 | 25 | 25 | 25 |

AC: Abbreviation for acrylic resin
C-303: Melamine resin (manufactured by Mitsui Toatsu Chemicals, Inc.)
PC: Abbreviation for polycarbonate resin Preparation of Clear Coating 90 Parts of xylene was charged into a reaction vessel and heated to 100° C. A monomer mixed solution (1.2 parts of methacrylic acid, 26.4 parts of styrene, 26.4 parts of methyl methacrylate, 36.0 parts of n-butyl acrylate, 10.0 parts of 2-hydroxyethyl acrylate and 1.0 part of azobisisobutyronitrile) was added dropwise at an uniform rate over 3 hours, and then a solution comprising of 0.3 part of azobisisobutyronitrile and 10.0 parts of xylene was added dropwise over 30 minutes. The reaction was continued for additional 2 hours to obtain an acrylic resin solution having a nonvolatile content of 50% and a number-average molecular weight of 8,000.

By using the acrylic resin, a clear coating was prepared according to the following formulation.

| Formulation of clear coating |  |
|---|---|
| Acrylic resin solution | 100 Parts |
| YUBAN 20SE-60 | 36 Parts |
| (manufactured by Mitsui Toatsu Chemicals, Inc.) |  |
| MODAFLOW | 0.5 Part |
| (manufactured by Monsanto Co.) |  |

To the resulting aqueous metallic base coating compositions of Examples 7 to 12 or Comparative Examples 4 to 6, 1 part of NACURE 5225 (amine-blocked acid catalyst, manufactured by King Industries Inc.) was added, respectively. Thereafter, the respective mixtures were diluted with deionized water to adjust the viscosity to 30 second/#4 Ford cup (25° C.). The solution was coated on a steel plate, on which an intercoating had been provided in advance, by a spray coating such that the dry film thickness became 15 to 50 μm and then dried at 80° C. for 2 minutes. Thereafter, a clear paint was coated such that the dry film thickness became 30 μm and set for 7 minutes, and then baked at 140° C. for 30 minutes. Thereafter, the final surface texture and water resistance of the coating were evaluated. The results are shown in Table 6. The coating conditions were adjusted to a temperature of 25° C. and a humidity of 70%.

TABLE 6

|  | Example No. |  |  |  |  |  | Comparative Example No. |  |  |
|---|---|---|---|---|---|---|---|---|---|
|  | 7 | 8 | 9 | 10 | 11 | 12 | 4 | 5 | 6 |
| Pinhole critical film thickness (μm) | 35 | 35 | 35 | 35 | 35 | 30 | 20 | 30 | 20 |
| Sagging critical film thickness (μm) | 30 | 30 | 25 | 30 | 30 | 25 | 20 | 10 | 25 |
| Smoothness of coating | o | o | o | o | o | o | Δ | Δ | x |
| Appearance of coating (flip effect) | o | o | o | o | o | Δ | x | x | x |
| Water resistance | o | o | o | o | o | x | x | x | o |

Appearance of coating:
o: Good (orientation of aluminum is good, and a flopped value measured by a metallic aviarance tester is not less than 30)
Δ: Slightly inferior (orientation of aluminum is slightly inferior, and a flopped value is within a range of 25 to 30)
x: Inferior (orientation of aluminum is inferior, and a flopped value is less than 25)

Production Example 11 (Emulsion-Polymerized Particles)

185 Parts of deionized water was charged into a 500 ml vessel equipped with a nitrogen introducing tube, a stirrer, a cooler, a thermal regulator and a dropping funnel, and heated to 83° C. A mixture comprising 20 parts of ALONIX M5300 (manufactured by Toagosei Chemical Industry Co., Ltd.), 5.9 parts of dimethylethanolamine and 80 parts of styrene was added dropwise from the dropping funnel over 2 hours. At the same time, a solution as an initiator prepared by neutralizing 1 part of 4,4'-azobis-4-cyanovaleric acid with 0.55 part of dimethylethanolamine, followed by dissolving in 40 parts of deionized water was added dropwise. The mixture was stirred at 83° C. for additional one hour and then cooled to obtain a milk white emulsion (XI) having a solid content of 30% and a particle size of 100 nm (laser light scattering method).

Production Example 12 (Emulsion-Polymerized Particles)

According to the same operation as that described in Production Example 9 except that the amount of deionized water on initial charging was 197 parts and 5.6 parts of a reactive emulsifier RA-1022 (manufactured by Nippon Emulsifier Co., Ltd.) was added to the monomer mixture, a milk white emulsion (XII) having a solid content of 30% and a particle size of 94 nm (laser light scattering method) was obtained.

Production Example 13 (Emulsion-Polymerized Particles)

180 Parts of deionized water, 10 parts of styrene, 0.7 part of methacrylic acid and 0.7 part of dimethylethanolamine were charged into the same reaction vessel as that of Production Example 9 and heated to 83° C. Then, a solution prepared by neutralizing 0.5 part of 4,4'-azobis-4-cyanovaleric acid with 0.27 part of dimethylethanolamine, followed by dissolving in 5 parts of deionized water was added dropwise over 20 minutes. Further, a mixture comprising 84.3 parts of styrene, 5 parts of methacrylic acid and 5 parts of dimethylethanolamine and a solution prepared by neutralizing 0.5 part of 4,4'-azobis-4-cyanovaleric acid with 0.27 part of dimethylethanolamine, followed by dissolving in 40 parts of deionized water were added dropwise over 2 hours. The mixture was stirred for additional one hour to obtain a milk white emulsion (XIII) having a solid content of 30% and a particle size of 330 nm (laser light scattering method).

Production Example 14 (Polyester Resin)

A reaction vessel was charged with 9.30 parts of ethylene glycol, 28.80 parts of 2-butyl-2-ethyl-1,3-propane diol, 12.91 parts of trimethylolpropane, 40.55 parts of isophtharic acid and 16.12 parts of hexahydrophtharic anhydride, and heated at a temperature of 160° to 220° C. to esterify for 7 hours. To the content, 13.39 parts of trimellitic anhydride was added and reacted at 180° C. for one hour to obtain a polyester resin having an acid value of 45, a hydroxyl value of 70 and a number average molecular weight of 2,500.

The resulting resin was neutralized with diethanolamine to obtain an aqueous polyester resin varnish (XIV) having a neutralizing degree of 80% and a nonvolatile content of 35% by weight.

Production Example 15 (Crosslinked Particles)

A milk white emulsion (XV) having a solid content of 30% and a particle size of 91 nm (laser light scattering method) was obtained as generally described in Production Example 11, with the exception that 70 parts of styrene and 10 parts of ethyleneglycol dimethacrylate were employed instead of 80 part of styrene.

EXAMPLES i TO ix AND COMPARATIVE EXAMPLES i TO v

According to the formulation shown in Table 7, an aqueous metallic base paint was prepared.

As a pigment, 12 parts of an aluminum pigment was formulated for 100 parts of the total solid content of the components (A), (B) and (C) and the emulsion-polymerized particles (D). The aluminum pigment (ALPASTE 7160N, amount of aluminum metal pigment: 65%, manufactured by Toyo Aluminum K.K.) was uniformly premixed with melamine resin and 2 parts of isostearyl acid phosphate (PHOSREX A-180L, manufactured by Sakai Kagaku Co., Ltd.) and the resulting solution was used as an aluminum pigment solution.

TABLE 7

| | | Example No. | | | | | | |
|---|---|---|---|---|---|---|---|---|
| | | i | ii | iii | iv | v | vi | vii |
| (A) Component | Kind of resin | AC(IV) | AC(IV) | AC(IV) | AC(IV) | AC(IV) | PE(XIV) | PE(XIV) |
| | Amount | 45 | 45 | 55 | 35 | 35 | 45 | 45 |
| (B) Component | Kind of resin | PC(V) | PC(VI) | PC(VII) | PC(X) | PC(V) | PC(V) | PC(V) |
| | Amount | 15 | 15 | 10 | 35 | 5 | 15 | 15 |
| (C) Component | Kind of resin | C-303 | C-303 | C-303 | C-303 | C-303 | C-303 | C-303 |
| | Amount | 25 | 25 | 25 | 25 | 25 | 25 | 25 |
| (D) Component | Kind of resin | EM(XI) | EM(XII) | EM(XI) | EM(XI) | EM(XI) | EM(IX) | — |
| | Amount | 15 | 15 | 10 | 5 | 35 | 15 | — |

| | | Example No. | | Comparative Example No. | | | | |
|---|---|---|---|---|---|---|---|---|
| | | viii | ix | i | ii | iii | iv | v |
| (A) Component | Kind of resin | AC(IV)30 PE(XIV)15 | AC(IV) | AC(IV) | AC(IV) | AC(IV) | AC(IV) | AC(III) |
| | Amount | | 45 | 50 | 50 | 45 | 45 | 45 |
| (B) Component | Kind of resin | PC(V) | PC(V) | — | PC(V) | PC(VIII) | PC(IX) | PC(V) |
| | Amount | 20 | 15 | — | 25 | 15 | 15 | 15 |
| (C) Component | Kind of resin | C-303 | C-303 | C-303 | C-303 | C-303 | C-303 | C-303 |
| | Amount | 25 | 25 | 25 | 25 | 25 | 25 | 25 |
| (D) Component | Kind of resin | EM(X) | EM(XV) | EM(XI) | — | EM(XI) | EM(XI) | EM(XI) |
| | Amount | 10 | 15 | 25 | — | 15 | 15 | 15 |

AC: Acrylic resin
PE: Polyester resin
PC: Polycarbonate
C-303: Melamine resin
EM: Emulsion polymerized particles

Preparation of Clear Paint (1)

90 Parts of xylene was charged into a reaction vessel and heated to 100° C. A monomer mixed solution (1.2 parts of methacrylic acid, 26.4 parts of styrene, 26.4 parts of methyl methacrylate, 36.0 parts of n-butyl 0.3 part of azobisisobutyronitrile and 10.0 parts of xylene was added dropwise over 30 minutes. The reaction was continued for additional 2 hours to obtain an acrylic resin solution having a nonvolatile content of 50% and a number-average molecular weight of 8,000.

By using this acrylic resin, a clear paint (1) was prepared according to the following formulation.

| Formulation of clear paint (1) | |
| --- | --- |
| Acrylic resin solution | 100 Parts |
| YUBAN 20SE-60 | 36 Parts |
| (manufactured by Mitsui Toatsu Co., Ltd.) | |
| MODAFLOW | 0.5 Part |
| (manufactured by Monsanto Co.) | |

To the resulting aqueous metallic base paints of Examples i to viii and Comparative Examples i to v, 1 part of NACURE 5225 (amine-blocked acid catalyst, manufactured by King Industries Inc.) was added, respectively. Thereafter, the respective mixtures were diluted with deionized water to adjust the viscosity to 30 second/#4 Ford cup (25° C.). The solution was coated on a steel plate, on which an intercoating had been provided in advance, by spray coating such that the dry film thickness became 10 to 50 μm and then dried at 80° C. for 2 minutes. Thereafter, a clear paint (1) was coated such that the dry film thickness became 30 μm and set for 7 minutes, and then baked at 140° C. for 30 minutes. Thereafter, the final surface texture and water resistance of the coating were evaluated. The results are shown in Table 8. The coating conditions were adjusted to a temperature of 25° C. and a humidity of 70% and

TABLE 8

| | | Example No. | | | | | | | | |
| --- | --- | --- | --- | --- | --- | --- | --- | --- | --- | --- |
| | | i | ii | iii | iv | v | vi | vii | viii | ix |
| Humidity of 70% | Pinhole critical film thickness (μm) | 40 | 40 | 40 | 40 | 35 | 40 | 40 | 40 | 40 |
| | Sagging critical film thickness (μm) | 40 | 40 | 40 | 35 | 40 | 35 | 35 | 40 | 40 |
| | Smoothness of coating | o | o | o | o | o | o | o | o | o |
| | Appearance of coating (flip effect) | o | o | o | o | o | o | o | o | o |
| | Water resistance of coat | o | o | o | o | o | o | o | o | o |
| Humidity of 85% | Pinhole critical film thickness (μm) | 35 | 35 | 35 | 35 | 30 | 35 | 35 | 35 | 35 |
| | Sagging critical film thickness (μm) | 35 | 35 | 30 | 30 | 35 | 30 | 30 | 35 | 38 |
| | Smoothness of coating | o | o | o | o | o | o | o | o | o |
| | Appearance of coating (flip effect) | o | o | o | o | o | o | o | o | o |

| | | Comparative Example No. | | | | |
| --- | --- | --- | --- | --- | --- | --- |
| | | i | ii | iii | iv | v |

TABLE 8-continued

| Humidity of 70% | Pinhole critical film thickness (μm) | 15 | 30 | 15 | 20 | 15 |
| --- | --- | --- | --- | --- | --- | --- |
| | Sagging critical film thickness (μm) | 25 | 10 | 10 | 25 | 15 |
| | Smoothness of coating | x | o | Δ | x | Δ |
| | Appearance of coating (flip effect) | Δ | x | x | Δ | x |
| | Water resistance of coating | x | o | x | o | x |
| Humidity of 85% | Pinhole critical film thickness (μm) | 10> | 20 | 10 | 10 | 10 |
| | Sagging critical film thickness (μm) | 20 | 10> | 10> | 10> | 10> |
| | Smoothness of coating | x | o | x | Δ | Δ |
| | Appearance of coating (flip effect) | x | x | x | Δ | x |

EXAMPLE A

The aqueous metallic coating compositions obtained in Examples i to viii were diluted with deionized water to adjust the viscosity to 30 second/#4 Ford cup (25° C.). The solution was coated on a steel plate, on which an intercoating had been provided in advance, by spray coating such that the dry film thickness became 10 to 50 μm and then dried at 80° C. for 2 minutes. Thereafter, a clear coating (2) was coated such that the dry film thickness became 30 μm and set for 7 minutes, and then baked at 140° C. for 30 minutes. Thereafter, the final surface texture and water resistance of the coating were evaluated. The results are shown in Table 9. The coating conditions were adjusted to a temperature of 25° C. and a humidity of 70% and 85%.

TABLE 9

| | | Example No. | | | | | | | |
| --- | --- | --- | --- | --- | --- | --- | --- | --- | --- |
| Base coating to be used | | i | ii | iii | iv | v | vi | vii | viii |
| Humidity of 70% | Pinhole critical film thickness (μm) | 40 | 40 | 40 | 40 | 35 | 40 | 35 | 40 |
| | Sagging critical film thickness (μm) | 40 | 35 | 40 | 30 | 40 | 35 | 30 | 40 |
| | Smoothness of coating | o | o | o | o | o | o | o | o |
| | Appearance of coating (flip effect) | o | o | o | o | o | o | o | o |
| | Water resistance of coating | o | o | o | o | o | o | o | o |
| Humidity of 85% | Pinhole critical film thickness (μm) | 35 | 35 | 35 | 35 | 30 | 35 | 30 | 35 |
| | Sagging critical film thickness (μm) | 35 | 35 | 30 | 30 | 35 | 30 | 25 | 35 |
| | Smoothness of coating | o | o | o | o | o | o | o | o |
| | Appearance of coating (flip effect) | o | o | o | o | o | o | o | o |

Preparation of Clear Coating (2)

(1) Production of varnish

500 Parts of butyl acetate was charged into a 2 liter reaction vessel equipped with a nitrogen introducing tube, a stirrer, a condenser, a thermal regulator and a dropping funnel, and heated to 125° C. A solution comprising 50 parts of styrene, 400 parts of glycidyl methacrylate, 350 parts of 2-hydroxyethyl methacrylate, 200 parts of 2-ethylhexyl acrylate and 70 parts of t-butylperoxy- 2-ethyl hexanoate was added dropwise from the dropping funnel over 3 hours. After the completion of the addition, the mixture was maintained at 125° C. for 30 minutes. Then, a solution comprising 10 parts of t-butylperoxy- 2-ethyl hexanoate and 250 parts of xylene was added dropwise over 30 minutes. After the completion of the addition, the reaction was continued at 125° C. for additional 2 hours to obtain an acrylic resin varnish having a nonvolatile content of 59% and a number-average molecular weight of 4,000.

(2) Production of carboxylic anhydride group-containing polymer

80 Parts of xylene was charged into a 1 liter reaction vessel equipped with a nitrogen introducing tube, a stirrer, a condenser, a thermal regulator and a dropping funnel, and heated to 115° C. A monomer comprising 25 parts of styrene, 21 parts of N-butyl acrylate, 95 parts of N-butyl methacrylate, 34 parts of 2-ethylhexyl methacrylate, 50 parts of itaconic anhydride, 100 parts of propylene glycol monomethyl ether acetate and 10 parts of t-butylperoxy-2-ethyl hexanoate and an initiator solution were added dropwise over 3 hours. Further, the mixture was stirred for additional 2 hours to obtain a carboxylic anhydride group-containing polymer having a nonvolatile content of 53% and a number-average molecular weight of 5,500.

(3) Production of half-esterified polymer

To 385 parts of the carboxylic anhydride group-containing polymer synthesized in the above item (2), 1.35 parts of triethylamine dissolved in 35 parts of butyl acetate and 18.2 parts of methanol were added, and the mixture was reacted at 40° C. for 12 hours to confirm by IR that absorption of the acid anhydride group (1785 cm$^{-1}$) has been completely disappeared. Thus, a half-esterified polymer was obtained.

(4) Production of Clear Paint

100 Parts of the varnish produced in the above item (1), 133.0 parts of the carboxylic anhydride group-containing polymer produced in the above item (3), 0.3 part of tetrabutylammonium bromide, 1.2 parts of TINUVIN-900 (benzotriazole UV absorber, manufactured by Ciba Geigy Co.) and 0.6 part of SANOL LS-292 (hindered amine photostabilizer, manufactured by Mitsui Co., Ltd.) were charged into a stainless vessel and the mixture was stirred by a laboratory stirrer to produce a clear paint. This clear paint was diluted with thinner (butyl acetate/xylene =1/1) to give a clear paint having a coating viscosity.

EXAMPLE B

To the resulting aqueous metallic base paints of Examples i to v and Comparative Examples i to viii, 1 part of NACURE 5225 (amine-blocked acid catalyst, manufactured by King Industries Inc.) was added, respectively. Thereafter, the respective mixtures were diluted with deionized water to adjust the viscosity to 30 second/#4 Ford cup (25° C.). The solution was coated on a steel plate, on which an intercoating had been provided in advance, by spray coating such that the dry film thickness became 10 to 50 μm and then dried with heating at 80° C. for 2 minutes. Thereafter, a powder coating was coated such that the dry film thickness became 80 μm and then baked at 160° C. for 30 minutes. Thereafter, the final surface texture and water resistance of the coat were evaluated. The results are shown in Table 10. The coating conditions were adjusted to a temperature of 25° C. and a humidity of 70% and 85%.

TABLE 10

| | Base coating to be used | Example No. | | | | | | | | Comparative Example No. | | | | |
| --- | --- | --- | --- | --- | --- | --- | --- | --- | --- | --- | --- | --- | --- | --- |
| | | i | ii | iii | iv | v | vi | vii | viii | i | ii | iii | iv | v |
| Humidity of 70% | Pinhole critical film thickness (μm) | 40 | 40 | 40 | 40 | 35 | 35 | 35 | 35 | 15 | 30 | 15 | 20 | 15 |
| | Sagging critical film thickness (μm) | 40 | 40 | 40 | 30 | 40 | 35 | 30 | 35 | 25 | 10 | 10 | 25 | 15 |
| | Smoothness of coating | Λ | Λ | Λ | Λ | Λ | Λ | Λ | Λ | x | Λ | x | x | x |
| | Appearance of coating (flip effect) | o | o | o | o | o | o | o | o | Λ | x | x | Λ | x |
| | Water resistance of coating | o | o | o | o | o | o | o | o | x | o | x | o | x |
| Humidity of 85% | Pinhole critical film thickness (μm) | 35 | 35 | 35 | 35 | 30 | 35 | 35 | 35 | 10> | 20 | 10 | 10 | 10 |
| | Sagging critical film thickness (μm) | 35 | 35 | 30 | 30 | 35 | 30 | 25 | 35 | 20 | 10> | 10> | 10> | 10> |
| | Smoothness of coating | Λ | Λ | Λ | Λ | Λ | Λ | Λ | Λ | x | Λ | x | x | x |
| | Appearance of coating (flip effect) | o | o | o | o | o | o | o | o | x | x | x | Λ | x |

In Table 10, "smoothness" was determined by the relative evaluation in case that the powder clear is used only.

Production Example of Resin for Powder Paint

63 Parts of xylene was charged into a flask equipped with a dropping funnel, an agitating element and a thermometer and heated to 130° C. A solution comprising 20 parts of styrene, 27 parts of methyl methacrylate, 45 parts of glycidyl methacrylate, 8 parts of isobutyl methacrylate and 7.5 parts of t-butylperoxy-2-ethyl hexanoate was added dropwise to the flask at an uniform rate over 3 hours, using the dropping funnel. After the completion of the addition, the mixture was maintained for 30 minutes. Then, 7 parts of xylene and 0.1 part of t-butylperoxy-2-ethyl hexanoate were added dropwise at an uniform rate, using the dropping funnel. After the completion of the addition, the mixture was maintained at 130° C. for additional one hour. Then, xylene was distilled off under reduced pressure to obtain an acrylic resin.

70 parts of the resulting acrylic resin, 19.1 parts of decanedicarboxylic acid, 0.11 part of CF-1056 and 0.89 part of benzoin were dry-mixed by a Henschel mixer (manufactured by Mitsui Miike Seisakusho Co., Ltd.) and then dissolved/dispersed at 100° C. by a CONEADER PR-46 (manufactured by Buss Co. Switzerland). After cooling, it was pulverized by a hammer mill and classified through a 150 mesh woven metal to obtain an acrylic powder clear paint.

Coating Process of Acrylic Powder Paint

It was conducted by an electrostatic coating method.
What is claimed is:

1. An aqueous coating composition which comprises:

(A) a polyester resin having an acid value of 10 to 100, a hydroxyl value of 20 to 300 and a number average-molecular weight of 1,000 to 50,000, said polyester resin being an oil-free polyester resin obtain by condensing a polyhydric alcohol with a polyhydric carboxylic acid, or an alkyd resin obtained by condensing a polyhydric alcohol and a polyhydric carboxylic acid with a coconut oil, a castor oil, a dehydrated castor oil, a linseed oil, a tall oil, a safflower soil, a soybean oil or a fatty acid thereof;

(B) a polycarbonate resin having a number average-molecular weight of 1,000 to 10,000, which contains a hydroxyl group at the terminal end; and (C) a curing agent.

2. An aqueous coating composition which comprises:

(A) an acrylic resin and/or a polyester resin having an acid value of 10 to 100, a hydroxyl value of 20 to 300 and a number average-molecular weight of 1,000 to 50,000;

(B) a polycarbonate resin having a number average-molecular weight of 1,000 to 10,000, which contains a hydroxyl group at the terminal end;

(C) a curing agent; and (D) acrylic resin particles having a particle size of 0.01 to 1.0 μm.

3. The aqueous coating composition according to claim 1, wherein the polyester resin of the component (A) is an oil-free polyester resin obtained by condensing a polyhydric alcohol with a polyhydric carboxylic acid, or an alkyd resin obtained by condensing a polyhydric alcohol and a polyhydric carboxylic acid with a coconut oil, a castor oil, a dehydrated castor oil, a linseed oil, a tall oil, a safflower oil, a soybean oil or a fatty acid thereof.

4. The aqueous coating composition according to claim 1, wherein the polycarbonate resin of the component (B) is a resin obtained by reacting a carbonate monomer selected from a dialkyl carbonate and an alkylene carbonate, with a straight-chain dihydric alcohol, a branched-chain dihydric alcohol and a polyhydric alcohol having three or more hydroxyl groups, wherein the amount of the branched-chain dihydric alcohol is at least 10 molar % based on the total amount of the alcohol and the amount of the polyhydric alcohol having three or more hydroxyl groups is not less than 10 molar %.

5. The aqueous coating composition according to claim 1 or 2, wherein the curing agent of the component (C) is a melamine resin.

6. The aqueous coating composition according to claim 1 or 2, wherein the curing agent of the component (C) is a blocked polyisocyanate.

7. The aqueous coating composition according to claim 1 or 2, wherein the amount of the component (A) is 35 to 70% by weight, the amount of the component (B) is 5 to 50% by weight and the amount of the component (C) is 10 to 40% by weight; % by weight being based on the weight of the solid content of the composition.

8. The aqueous coating composition according to claim 1, which further comprises acrylic resin particles (D) having a particle size of 0.01 to 1.0 μm.

9. The aqueous coating composition according to claim 8 or 2, wherein said acrylic resin particles have an acid value of 5 or more, which contain a carboxyl group.

10. The aqueous coating composition according to claim 8 or 2, wherein said acrylic resin particles are three-dimensionally crosslinked.

11. The aqueous coating composition according to claim 9, wherein said acrylic resin particles are not three-dimensionally crosslinked.

12. The aqueous coating composition according to claim 8 or 2, wherein the amount of the component (D) is 3 to 70 parts by weight, based on 100 parts by weight of the total weight of the solid content of the components (A) to (C).

13. The aqueous coating composition according to claim 1 or 2, which further comprises a metal pigment in the amount of 2 to 100 parts by weight, based on 100 parts by weight of the resin solid content of the aqueous coating composition.

14. An aqueous coating composition which comprises:

(A) an acrylic resin and/or a polyester resin having an acid value of 10 to 100, a hydroxyl value of 20 to 300 and a number average-molecular weight of 1,000 to 50,000;

(B) a polycarbonate resin having a number average-molecular weight of 1,000 to 10,000, which contains a hydroxyl group at the terminal end; and (C) a curing agent;

(D) acrylic resin particles having a particle size of 0.01 to 1.0 μm, and (E) a metal pigment.

15. The aqueous coating composition according to claim 14, wherein said acrylic resin particles (D) have an acid value of 5 or more, which contain a carboxyl group.

* * * * *